United States Patent [19]

Chang

[11] Patent Number: 6,058,113
[45] Date of Patent: May 2, 2000

[54] METHOD FOR ENHANCING RESOURCE RESERVATION COMMUNICATION

[75] Inventor: Young-fu Chang, Buffalo Grove, Ill.

[73] Assignee: Lucent Technologies, Inc., Murray Hill, N.J.

[21] Appl. No.: 08/940,251

[22] Filed: Sep. 30, 1997

[51] Int. Cl.$^7$ .................................................. H04L 12/28
[52] U.S. Cl. ........................... 370/390; 370/432; 370/236
[58] Field of Search ..................................... 370/390, 229, 370/231, 235, 236, 443, 444, 400, 410, 432

[56] References Cited

U.S. PATENT DOCUMENTS

| | | | |
|---|---|---|---|
| 5,517,494 | 5/1996 | Green .......................................... | 370/60 |
| 5,541,927 | 7/1996 | Kristol et al. ............................ | 370/94.2 |
| 5,634,011 | 5/1997 | Auerbach et al. ........................ | 709/242 |
| 5,805,578 | 9/1998 | Stirpe et al. .............................. | 370/255 |
| 5,898,686 | 4/1999 | Virgile ....................................... | 370/381 |

OTHER PUBLICATIONS

RSVP: A New Resource ReSerVaton Protocol by Lixia Zhang, Stephen Deering, Deborah Estrin, Scott Shenker and Daniel Zappala, IEEE Network, Sep. 1993.

Resource ReSerVationProtocol (RSVP)—Version 1 Functional Specification, Jun. 14, 1997, by R. Braden, L. Zhang, S. Berwon, S. Herzog & S. Jamin.

rfc1112 Host Extensions for IP Multicasting, S. Deering, Stanford University, Aug. 1989.

*Primary Examiner*—Hassan Kizou
*Assistant Examiner*—Mitchell Slavitt

[57] ABSTRACT

A method for establishing and maintaining data communication between communication devices including at least one sender communication device and a receiving communication device of a multicast group which are interconnected by a communications network of switching nodes that involves determining when there is a change in the state of the multicast group. The receiving communication device normally maintains a resource reservation in response to data being substantially continuously received at the switching nodes unless there is a change in the state of the multicast group. Upon determination of the state change in the multicast group, the inventive method changes the resource reservation even while data is being continually received at the switching nodes.

22 Claims, 5 Drawing Sheets

| | ROUTING TABLE OF SWITCHING NODE B | |
|---|---|---|
| | TO REACH HOSTS ON NETWORK | ROUTE TO THIS ADDRESS |
| 81 | A | SWITCH A — 82 |
| 83 | SENDER | SWITCH A — 84 |
| 85 | B | DIRECT DELIVERY — 86 |
| 87 | C | SWITCH C — 88 |
| 89 | D | SWITCH C — 90 |

METHOD FOR ENHANCING RESOURCE RESERVATION COMMUNICATION

BACKGROUND OF THE INVENTION

1. Technical Field

This invention relates generally to a method of communicating between devices in networks, and more particularly, to multicast communications protocols for networks.

2. Background of the Invention

Communications protocols provide a set of rules or procedures generally relating to format and timing of data transmission between devices in a computer network. The computer network is formed of host devices which transmit information between one another and are connected by a communications network of switching elements or switching nodes. Multicasting is a form of communication in which a message is received by a subset of hosts within the network. In a point-to-multipoint multicasting environment, a source host device or source node generates and communicates a message with two or more destination or receiving hosts. Multicasting may also involve a multipoint-to-multipoint communication where a subset of sending nodes in the network transmit information to two or more receiving nodes.

Multicasting protocols have been developed to provide a communication framework in a multicasting environment. The Resource Reservation Protocol (commonly referred to as RSVP) is used for providing resource reservation in multicast connections. RSVP is designed to aid a multicast protocol. However, RSVP has been found to be inefficient and problematic especially when the number of receiving host devices is very large. The basic operation of the RSVP is to send a PATH message from the source to the destinations, and the destinations then respond with a RESERVATION message. To establish the connections to multiple receivers, the PATH message is routed according to a routing table in the intermediate switching nodes. Because of different capabilities in the receiving devices, the receivers specify the resource required for accepting the connection. However, the routing path from the source to the destination for the PATH message may not be the same as the other direction for the RESERVATION message. Thus, in the RSVP reverse route, tables are required to be kept in each intermediate switching node to provide the reverse routing table.

When a source host sends out a PATH message to reserve resource, the receivers will respond with a RESERVATION message to reserve the resource for the multicast session. One of the styles in the RSVP protocol requires the switching node (or nodes) to maintain individual source's information for the multicast session. Furthermore, it is required in RSVP to specify the refresh period used by the sender. The switching node uses the specified refresh period as a guideline in attempting to maintain the resource reservation in the switching node. Moreover, the PATH and RESERVATION messages must be exchanged constantly (e.g. every 100 ms) in order to keep the reservation of resources in each intermediate switching node. Disadvantageously however, the receiving nodes are required to continually periodically respond with RESERVATION messages to appropriately reserve the resource.

This constant refreshing scheme of reserving resources is employed to account for state changes in the multicast group such as dynamic routing table changes in the packet data network. By the continuous refreshing of resource reservations, the left over reservations in the switching nodes due to routing table changes are merely flushed out when they are not refreshed within the predetermined time. Unfortunately, the constant refreshing scheme requires an extremely high volume of messages especially at the edge of the network and has shown to be a real-time processing drain for the edge switches. The large message exchanging and real-time intensive processing is significantly problematic and inefficient for large scale multicast groups. Therefore, there is a need in the art for efficiently maintaining correct resource reservation along a multicast path even when network routing is changed at the switching nodes and when other state changes in the network occur.

SUMMARY OF THE INVENTION

The problems noted above are solved in accordance with the invention, by a method of establishing and maintaining data communications in a multicast group from a sender node to one or more receiving communication devices. The inventive method transmits information from the sender node to the receiving node(s) along a multicast path and reserves resources required to maintain communication without the need for the constant periodic exchange of path and reservation messages between the sender and receiving communication devices. The inventive method further enables correct resource reservation to be maintained along the multicast path when changes in the state of the multicast group are observed.

In particular, the present invention is a method of establishing and maintaining data communications between selected ones of a plurality of communication devices defining a multicast group interconnected by a communications network of switching nodes, determining when there is a change in the state of the multicast group, normally maintaining a resource reservation of a receiving communication device in response to data being substantially continuously received at the switching nodes unless there is a change in the state of the multicast group, and changing the resource reservation of the receiving communication device to a new resource reservation even while data is being substantially continuously received in response to determination of the change in the state of the multicast group.

These and other features of this invention will become apparent from the following detailed description, the accompanying drawings and the appended claims.

BRIEF DESCRIPTION OF THE DRAWINGS

The advantages of this invention will become apparent upon reading the following detailed description and upon reference to the drawings in which.

DETAILED DESCRIPTION

Figures 1, 3:
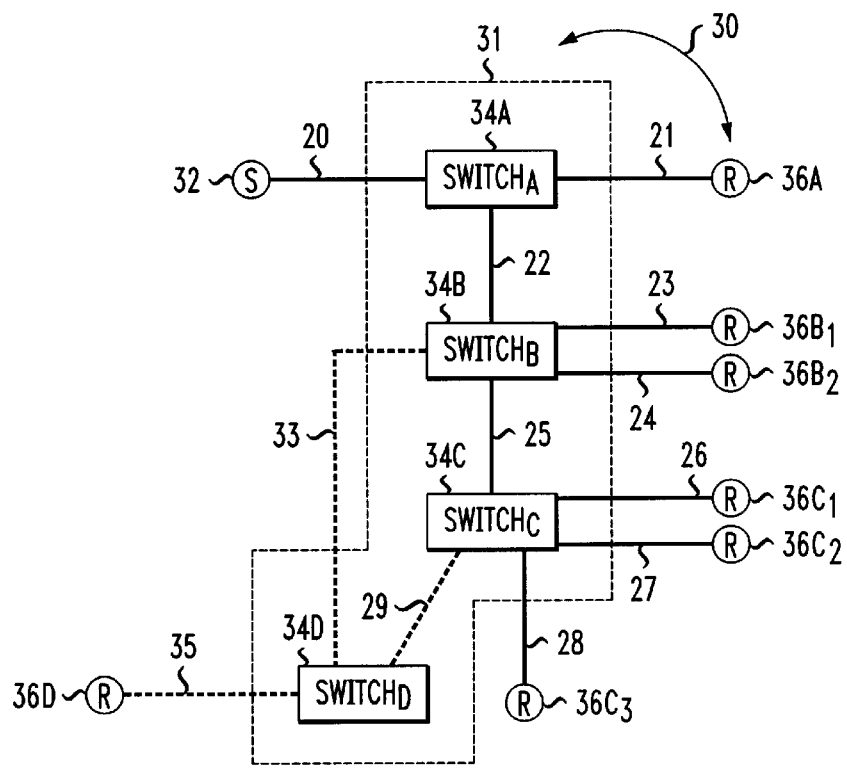
FIG. 1 illustrates the structure of a computer network of switching nodes, a sender node and receiving nodes in which the inventive method may be practiced.
FIG. 3 illustrates a routing table for switching node 34B of FIG. 1.

FIG. 1 illustrates a computer network in which the method of establishing and maintaining data communications between a plurality of communications devices of the present invention may be practiced. The communications devices shown include a sender communication device (sender node) 32 which exchanges information with selected ones of a plurality of receiving communication devices (receiving nodes) 36A–36D. The sender node 32 (also called source node) and the receiving nodes 36A–36D define a multicast group 30 in which the sender node is interconnected to the various receiving nodes by a communications network 31 of switching nodes 34A–34D. The communication devices (32, 36A–36D) are preferably computer based devices (or hosts) which execute application programs and perform various tasks such as multimedia conferencing, electronic mail, file transfer, world wide web, internet telephony and realtime internet fax service among others.

Information is transferred between the host communication devices (sender node, receiving nodes) via the network 31 of switching nodes 34A–34D and a plurality of communication links which couple the communication devices to the switching nodes. Each communication device (sender nodes, receiving nodes) is connected with one, or possibly several switching nodes 34. Preferably, communication between the host communication devices 32, 36A–36D and the switching nodes 34A–34D is done across interconnecting links such as asynchronous transfer mode (ATM), frame-relay, fiber distributed data interface (FDDI), etc. however, such data communication may also be suitably performed via wireless data transmission. Examples of switching nodes are routers, layer 3 switches and the like which provide an interface between networks. The switching nodes 34A–34D determine the next hop of a packet based on its destination address. Switching nodes such as router/bridge support the conversion between different media types (e.g. from ethernet to frame-relay).

Information is communicated within the multicast group 30 by following a preselected well-defined set of rules or protocol that specifies the manner in which communication is performed. The present invention provides an improved method of communicating between a source communication device 32 and one or more receiving communication devices 36A–36D. Particularly for multicast communication within the network, the present invention provides enhanced communication performance and scalability especially when the number of receiving devices is very large. FIG. 1 shows routing paths from a single sender node 32 to the multicast destinations (the receiving nodes) of the multicast group 30. Switching node 34A is shown in FIG. 1 to have incoming link 20 and outgoing links 21 and 22 for the multicast tree. Switching node 34B has incoming link 22 and outgoing links 23 and 24 connecting receiving devices $36B_1$ and $36B_2$ as well as outgoing link 25 coupled with switching node 34C. For multicast communication from the source node 32 of FIG. 1, switching node 34C has incoming link 25 and outgoing links 26, 27, 28 connected to receiving nodes $36C_1$, $36C_2$ and $36C_3$, respectively. Switching node 34D is coupled with switching node 34B and switching node 34C via links 33 and 29, respectively. Receiving node 36D is connected to its associated switching node 34D by link 35. Links 29, 33 and 35 are represented as dashed lines in FIG. 1 to illustrate alternate routing paths in multicast communication and situations in which a switching node 34D and/or a receiving node 36D join or leave the multicast group 30.

To provide the routing function of the packet data network, each switching node maintains a routing table. An example of a routing table 80 is seen in FIG. 3. The exemplary routing table 80, FIG. 3, is illustrative of a routing table for switching node 34B of FIG. 1. When receiving a data packet of information from a link, switching node 34B will look at the routing table 80, FIG. 3, stored in memory to determine the next hop of the packet to reach the destination. In switching node 34B of FIG. 1, if a packet is received from link 25, for example, with a destination being receiving node 36A, switching node 34B will examine routing table 80, FIG. 3, and determine that destination node 36A is in network A 81. Routing to destination node 36A in this example is accomplished via switching node 34A as indicated at address location 82 in routing table 80 of FIG. 3. The data packet will be sent to switching node 34A, FIG. 1.

The same arrangement is applied to hosts $36B_1$, and $36B_2$ of network B associated with switching node 34B; hosts $36C_1$, $36C_2$ and $36C_3$ of network C associated with switching node 34C and host 36D of network D associated with switching node 34D. The routing table 80, FIG. 3, for switching node 34B specifies in address location 83 to reach the sender host device 32, switching node 34B routes data to switching node 34A as seen in location 84. Address location 86 dictates that information is sent by direct delivery to host communication devices $36B_1$ and $36B_2$ on network B as identified in location 85. Routing of information to host devices on network C (i.e. communication devices $36C_1$, $36C_2$, $36C_3$) set forth in address location 87 is performed by sending data to switching node 34C as seen in location 88. The exemplary routing table 80 of FIG. 3 specifies in location 89 that to reach host communication devices 36D on network D, switching node 34B routes data to switching node 34C as seen in location 90. In turn, data will be routed to switching node 34D, FIG. 1, via link 29. Alternatively, data from switching node 34B to reach receiving node 36D may be routed directly to switch 34D via link 33.

When sender node 32 establishes connections with multiple receivers and to reserve resources in order to effectively maintain such connections, a path message is routed according to the routing table 80 in the intermediate nodes 34A, 34B, 34C. The multicast path from sender node 32, FIG. 1, to receiving node 36A is along links 20 and 21 via switching node 34A. The multicast routing path to receiving node $36B_1$ is along links 20, 22 and 23 while the path for receiving node $36B_2$ is along links 20, 22 and 24 with intermediate switching nodes 34A and 34B routing the information. Likewise, the multicast routing path between source 32 and receiving nodes $36C_1$, $36C_2$ and $36C_3$, FIG. 1, is along link 20, switching node 34A, link 22, switching node 34B, link 25, switching node 34C, whereby switching node 34C terminates with receiving nodes $36C_1$, $36C_2$ and $36C_3$ along links 26, 27 and 28, respectively. Because different receiving nodes may have varying capabilities, the receiving nodes $36A–36C_3$ specify the resource required for accepting the connection. The reservation of resources for quality of service (such as peak data rate, minimum policed unit, maximum packet size) is preferably done by the receiving nodes $36A–36C_3$ sending a reservation message in the opposite direction of the received path message along the multicast path for the particular receiving node in order to allocate resources required for path communication.

Once path and reservation messages are transmitted to initiate the resource reservation for a multicast session, a resource reservation is normally maintained for a receiving communication device $36A–36C_3$ in response to data being substantially continuously received at the switching nodes 34A, 34B, 34C. In one embodiment, the reservation for a multicast group is refreshed as data continues to flow through the switching nodes; in the case of asynchronous transfer mode communication, the resource is reserved via a virtual circuit connection to achieve the desired quality of service. Advantageously, no additional path and reservation messages are needed during normal data traffic to insure the reservation of resources. The resource reservations for receiving nodes are changed in response to a determination that certain changes have occurred in the state of the multicast group even while data is continued to be transmitted and is routed to different locations. Preferably, the process of determining if a resource reservation change is required is in response to a routing table change in a switching node, observed degradation in the quality of service of a receiving node or a new receiving node 36D, FIG. 1, joining or leaving the multicast group 30. By modifying the resource reservations upon certain changes in the state of the multicast group (such as switching node routing table changes) as well as dramatically reducing the continuous periodic exchange of path and reservation messages, the improved communication protocol of the present invention significantly improves performance and efficiency of the network operation.

Figure 2:
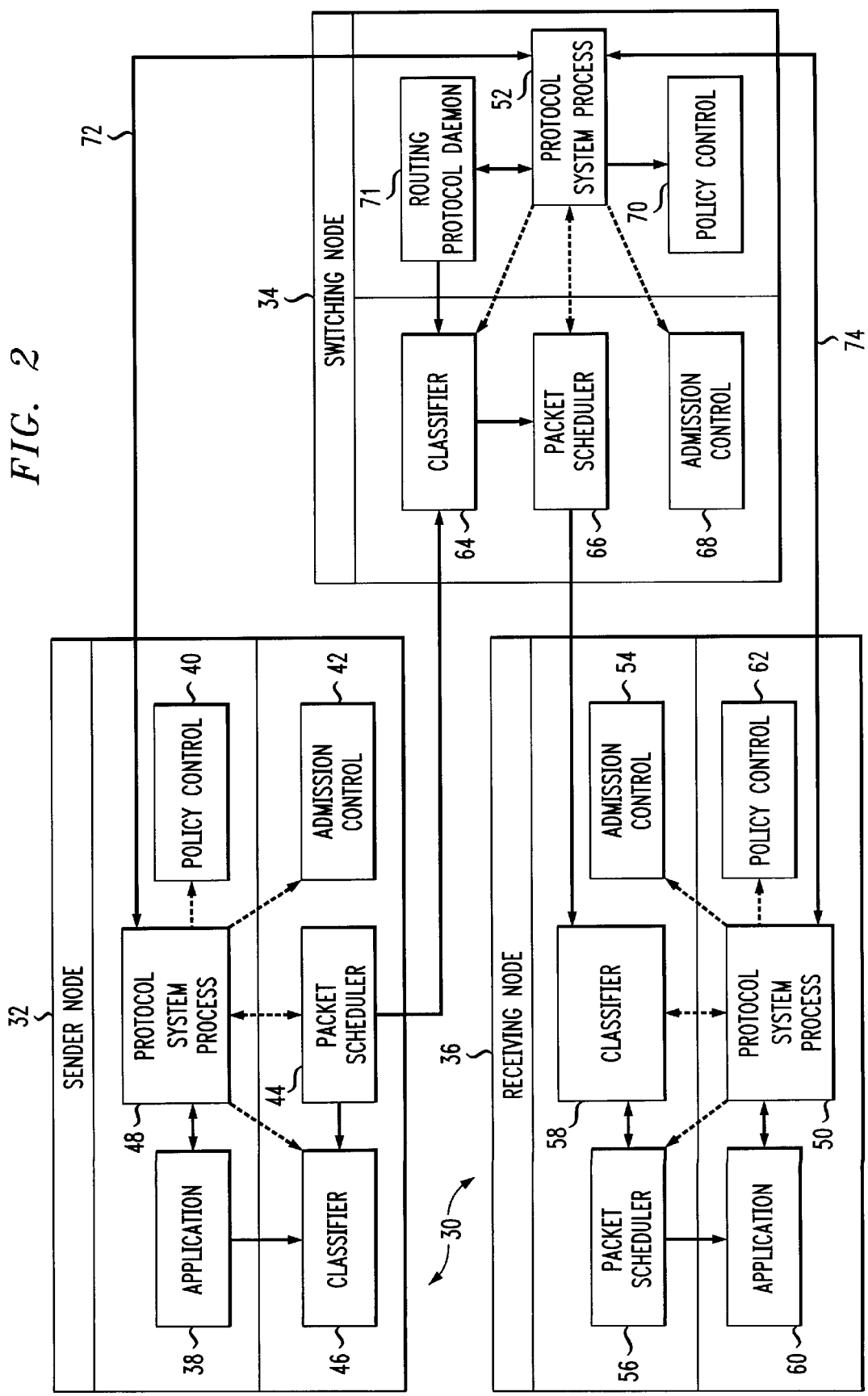
FIG. 2 is a block diagram of a sender node, switching node and receiver node in which the inventive method of the present invention may be practiced.

Referring now to FIG. 2, a block diagram is shown having various defined components for the sender communication device 32, switching node 34 and receiving communication device 36. It is seen in the method of establishing and maintaining data communications in the present invention that the step of sending a path message from the sender node 32 to a receiving node 36 along a multicast path is performed when initiating a resource reservation for a multicast session. Preferably, as seen in FIG. 1, the path message is transmitted to a plurality of receiving nodes 36A–36D via various intermediate switching nodes 34A–34D routing the messages upon execution of a multicasting scheme.

Figure 6:
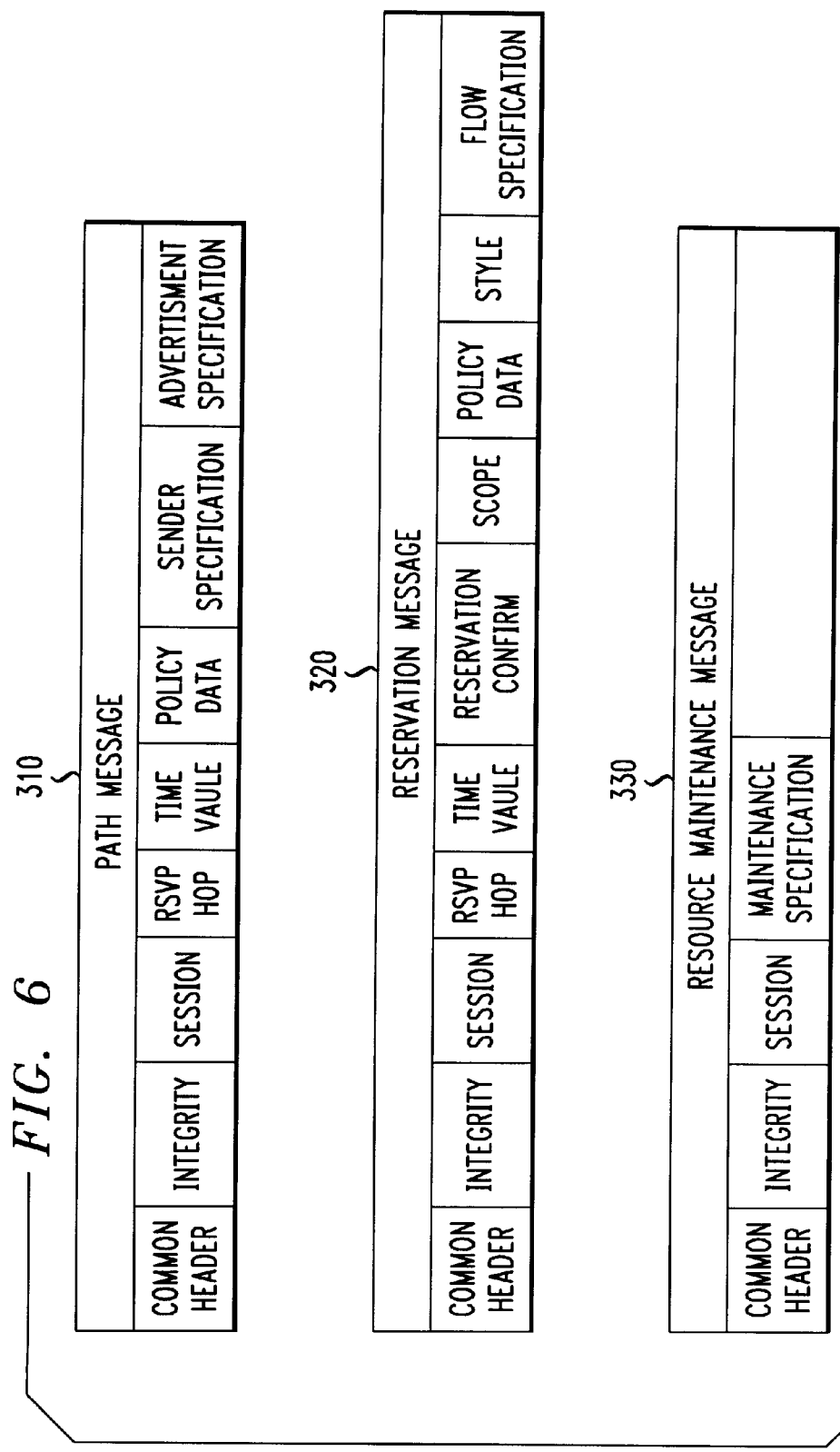
FIG. 6 illustrates exemplary information formats for a path message, reservation message and resource maintenance message of the inventive method.

The transmitted path message is subsequently received at the receiving communication device 36, FIG. 2, which in turn performs the step of sending a reservation message back to the sender communication device 32 via the switching nodes 34. The reservation message is often transmitted via the same route in the opposite direction (reverse route) of the received path message. In FIG. 6, exemplary data packets for a path message 310 and a reservation message 320 are shown. A path message preferably has the information of (1) cryptographic data to authenticate the originating node and to verify the content of the (path) message; (2) session identification information describing the transport address of the destination; (3) the last hop having knowledge of the resource reservation which forwarded the received (path) message; (4) time of refreshing the message by the creator; and (5) guaranteed service and controlled-load service information. A reservation message preferably contains information similar to items 1–4 listed above for a path message. A reservation message also often contains information relating to the style of reserving the resource (e.g. does the reservation need to distinguish the data stream of different senders); information on how to reserve resource (e.g. peak data rate, maximum packet size, etc.); and identification of the data stream (flow). The reservation message indicates the system resources which are needed to be reserved in order for the receiving node 36 to perform certain tasks or to ensure proper communication during a multicast session.

The sender node 32 has various defined components including an application 38, policy control 40, admission control 42, packet scheduler 44, classifier 46 and a protocol system process 48 as seen in FIG. 2. The protocol system process is a resident component in the host communication devices (sender nodes 32, receiving nodes 36) as well as the switching node router devices 34 to enable execution of the improved protocol of the present invention. As seen in FIG. 2, the receiving communication device 36 has protocol system process element 50 and the switching nodes 34 also contain a protocol system process 52 stored in memory of the switching nodes. The protocol system process in each of the sender node 32, receiving node 36 and switching node 34 provides information to its associated policy control, admission control, packet scheduler and classifier.

The protocol system process element is a software entity that processes the resource reservation related message and maintains the soft state for resource reservation operations. At each node the protocol system process element communicates with two local decision modules, admission control and policy control. Admission control 42 as seen in FIG. 2 for sender node 32 is a decision module which determines whether the node (device) which it is associated with has sufficient resources to meet the requested quality of service. Policy control 40 determines whether the user has administrative permission to make a reservation of particular resources. If both checks succeed, the protocol system process 48 sets parameters in the packet classifier 46 and packet scheduler 44 to obtain the desired quality of service. If either check fails, the processing returns an error notification to the application process 38 that originated the request. The packet classifier, packet scheduler and admission control components are referred to as traffic control.

As also seen in FIG. 2, the receiving communication device 36 has an application entity 60, policy control 62, admission control 54, packet scheduler 56 and classifier 58. The determinations and checks made, as described above with reference to the sender node 32, are also made at the receiving mode 36. The protocol system process 50 of the receiving communication device 36 interacts with its application entity 60, policy control 62, admission control 54, packet scheduler 56, classifier 58 for executing the proper steps for the processing of receiving and transmitting data messages within the network. Likewise, the protocol system process 52 for the switching node 34 communicates with its associated classifier 64, packet scheduler 66, admission control 68 and policy control 70 when processing messages from sender nodes, receiving nodes or other intermediate switching nodes. For further details on the resource reservation protocol and its operation in a multicast network, reference can be made to: R. Braden et al., "Resource ReSerVation Protocol (RSVP)—Version 1 Function Specification" Internet Draft, June 1997, and L. Zhang et al., "RSVP: A New Resource ReSerVation Protocol", IEEE Network Magazine, September 1993, which are incorporated herein by reference.

When the sender node 32 desires to execute a particular application in a multicast environment, the application entity 38 in the sender node requires a resource reservation. Preferably, the application entity 38, FIG. 2, is a software entity of the computer based sender communication device 32 that executes a specific task. The application entity 38 communicates with the protocol system process 48 in the sender node 32 by calling a set of defined application program interfaces (APIs) to register the sender role and specify the data stream characteristics and identifier for the resource reservation to begin the resource reservation session. The protocol system process entity 48 in the sender node 32 sends the path message along communication link 72 to the protocol system process entity 52 at the switching node 34. Upon receipt of the path message, the protocol system process 52 builds up a data structure or soft state in the switching node in order to send the path message downstream to receiving nodes 36 or other switching nodes 34B, 34C, 34D, FIG. 1, and to facilitate the resource reservation function in further processing. When the sender node 32 begins a resource reservation session to establish connections to multiple receivers 36A–36D, FIG. 1, the path messages are routed according to the routing table 80, FIG. 3, stored in memory at the routing protocol daemon 71, FIG. 2, in the intermediate switching nodes.

A soft state is built up at the intermediate switching nodes 34, FIG. 2, which refers to a state maintained at the network switching nodes for which status and routing information is recoverable when resources are sought to be reserved. The soft states are established at the switching nodes and identify incoming links and outgoing links for the path message. For example, a soft state for switching node 34 of FIG. 2 will identify link 72 as the incoming link and link 74 as the outgoing link for the path message received and transmitted at switch 34. Path states identifying the incoming links 72, FIG. 2, of a received path message and outgoing links 74 of the forwarded path message are kept at each intermediate switching node 34 along the multicast path of the network.

The path message is then sent to the protocol system process entity 50 of the receiving node 36. Using the set of defined application program interfaces (APIs), the receiving node application has registered the identifier and characteristics of the target data stream in the protocol system process. The protocol system process 50 of the receiving node 36 passes the received information of the path message to the packet scheduler 56, classifier 58, admission control 54 and policy control 62 of the receiving node to make a reservation, modify a reservation, delete a specification of reservation, etc. When the sender node 32 transmits a path message to reserve resource, the receiving nodes 36 respond with a reservation message to reserve the resource for the multicast session. The reservation message is sent from the receiving node 36 in reverse of the original route upstream to the original sender node 32. The reservation message sent from the receiving node 36 to the source node 32 is processed in the switching nodes 34, and forwarded to the previous hop according to the soft state maintained in memory after receipt of the path message at the switching nodes. In the reservation messages, the receiving nodes 36 must reserve resources such as a bit rate, maximum message size, peak bit rate, etc.

When a switching node 34 receives a reservation message, it must verify that proper resources through traffic control at the switching node. The protocol system process 50 of the receiver node 36 transmits the reservation message to the corresponding protocol system process 52 of the switching node 34 along the multicast path. The protocol system process 52 of the switching node 34 communicates with the classifier 64, packet scheduler 66, admission control 68 and policy control 70 to reserve resources required of the receiving node 36. Other intermediate switching nodes such as switching nodes 34A–34C for receivers $36C_1$–$36C_3$ along the multicast path to the sender 32 of FIG. 1 follow the same process of communication. The routing protocol daemon 71, FIG. 2, is the resident system software in the switching nodes 34 to process various routing protocols and maintain the routing table. Examples of routing protocols used in maintaining a routing table include Open Shortest Path First (OSPF) and Routing Information Protocol (RIP), among other routing protocols.

A determination is made at the switching node 34 as to whether there is a need to send the reservation message from the switching node upstream to the sender node 32. This is performed to reduce the number of messages when further processing in the upstream switching nodes is not required. If it is determined that the reservation is to be sent, then the reservation message is sent from the protocol system process 52, FIG. 2, of the switching node 34 back to the protocol system process 48 of the sender node 32. FIG. 6 illustrates packet structures which are preferably used in the present invention. The format of a path message 310 is shown with information relating to: a common header, integrity, session, RSVP hop, time value, policy data, sender specification and advertisement specification. The reservation message 320 contains information relating to: a common header, integrity, session, RSVP hop, time value, reservation confirmation, scope, policy data, style and flow specification. The resource maintenance message 330 of FIG. 6, contains a common header, integrity, session as well as the maintenance specification. The operation of the resource maintenance message 330 is discussed in further detail with reference to FIG. 5.

Figure 4:
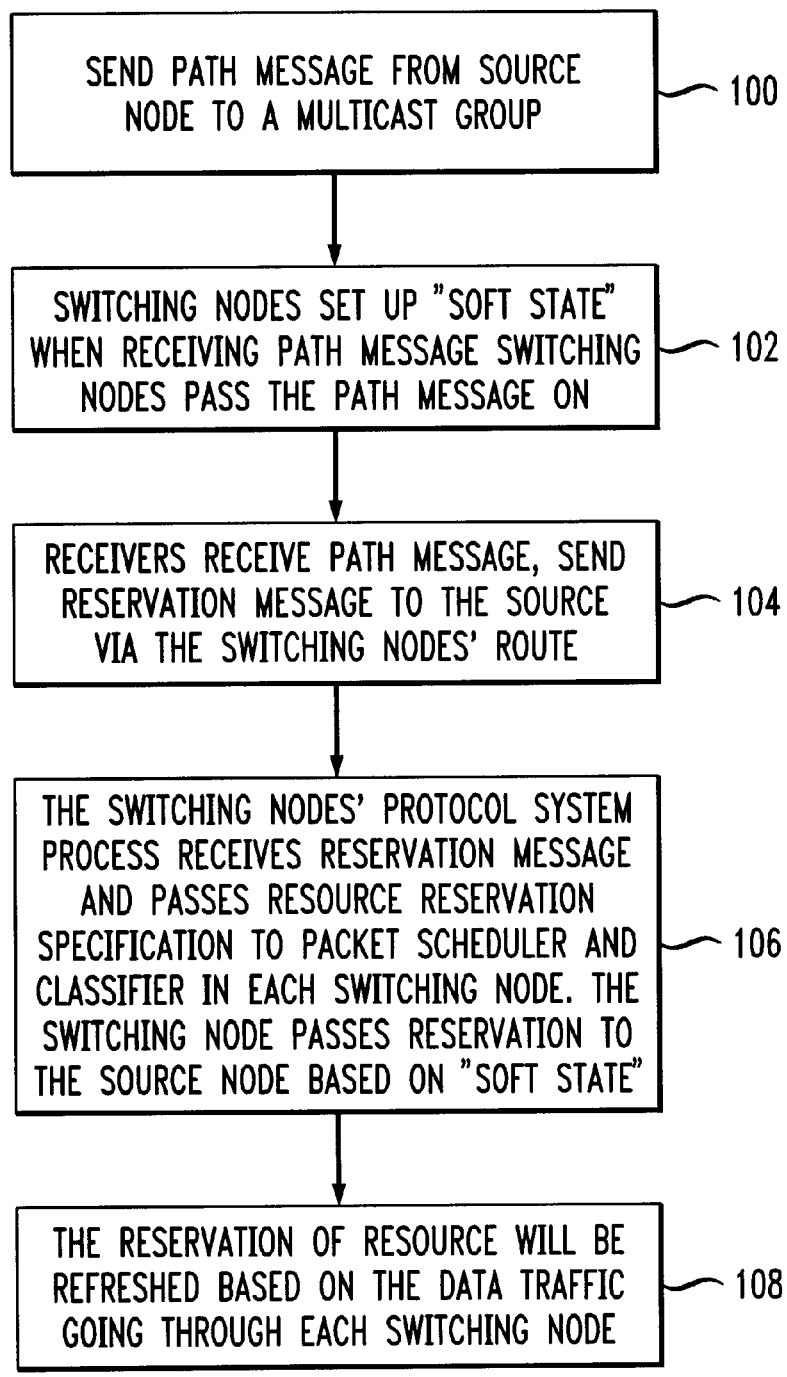
FIG. 4 is a flow diagram illustrating the steps performed for path and reservation communication for resource reservation.

Referring now to FIG. 4, the algorithmic steps of the path and reservation communications for the normal operation of the resource reservation are shown. In step 100, the sender node 32 sends a path message to the receiving nodes 36 of a multicast group. A special value of the timer variable in the path message is assigned to disable the timer. By recognizing a designated value being set, the constant exchange of numerous path and reservation messages to refresh resources is avoided. A time-out value may alternatively be prevented from being specified in the path message itself in order to cease refreshing of resource reservation by constant and continuous messaging. To be backward-compatible with existing communication processing, a time-out value can be alternatively set to an extremely high value suitable to simulate the disablement of the timer used in refreshing resource reservation. In the present invention the timer in the sender node for prompting continuous messaging for resource reservation refreshment is disabled to prevent the sending of additional path messages. In step 102, FIG. 4, the switching nodes 34 set up the soft state information when receiving the initial path message. The path message is transmitted to the next hop in the multicast path. The path message is passed directly to a designated receiving node 36, FIG. 2, from a single switching node or via other intermediate switching nodes 34A–34D, FIG. 1, until the path message reaches the receiving node. In step 104, FIG. 4, receiving nodes 36A–36D, FIG. 1, of the multicast group receive the path message, and send reservation messages back to the sender node 32 via the route of the switching nodes 34A–34D to reserve system resources for multicast communication.

In step 106, FIG. 4, the protocol system process 52, FIG. 2, of each switching node 34 receives the reservation message and passes the resource reservation specification to the packet scheduler 66 and classifier 64. The switching node 34 passes the reservation message to the sender node 32 based on the soft state maintained from the previous receipt of the path message in step 102. In step 108, FIG. 4, the reservation of the resources for the receiving nodes 36A–36D are refreshed based on data traffic flowing through each switching node 34A–34D, FIG. 1. The reservation of any multicast group is refreshed as the data traffic for a multicast application comes through the switching nodes 34. For instance, in the situation of an asynchronous transfer mode(ATM) connection, the virtual circuit connection is an example of providing packet scheduling for resource reservation. Thus, the resource reservation of receiving nodes 36A–36D are normally maintained in response to data traffic being substantially continuously received at the switching nodes 34A–34D, FIG. 1.

The resource reservation of the receiving communication devices 36 are preferably maintained unless there is a change in the state of the multicast group. The page replacement algorithms used in virtual memory such as the least recently used (LRU) scheme in handling the virtual memory or other related approaches to update the status of a resource reservation in switching nodes preferably maintains administration of the resource reservation. When data flow exists through the switching node 34, FIG. 2, the packet scheduler 66 and packet classifier 64 refer to the specification of the data, which enables the status of the reservation to be selectively marked with certain status fields indicating which has been accessed recently. If a new reservation is required, those reservations which are not accessed will be removed from the list. Preferably, no additional path and reservation messages are needed during the normal data traffic to insure the reservation of resources for data communication applications using the protocol of the invention.

Figure 5:
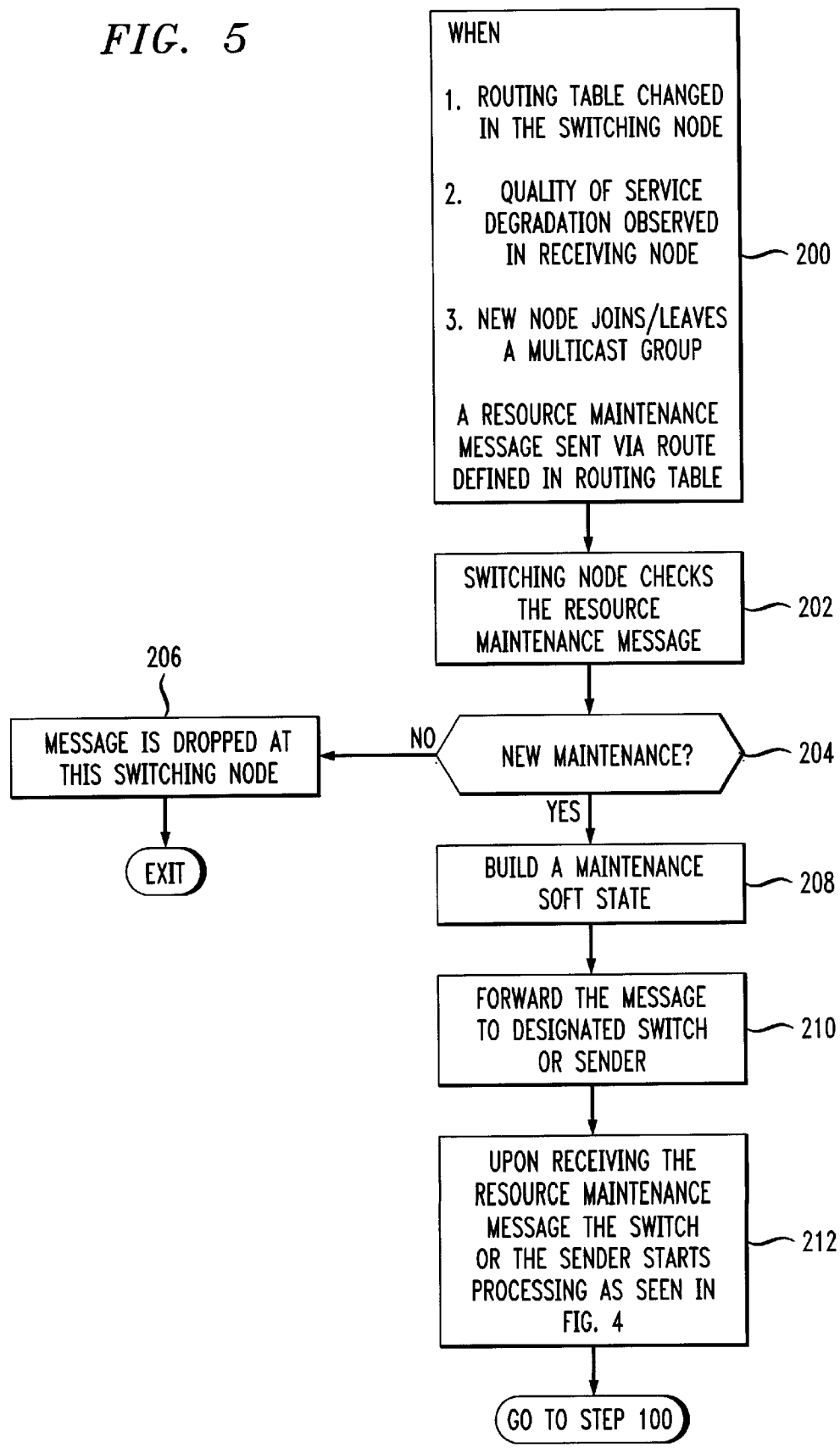
FIG. 5 is a flow diagram illustrating the steps performed for maintaining resource reservation when certain changes in the state of the multicast group occur.

Referring now to FIG. 5, algorithmic steps for the multicast group in the communications network are shown for maintaining correct resource reservation along the multicast path when a determination has been made of a change in the state of the multicast group. In the case of a routing table change or when receiving nodes join or leave the multicast group, the existing interface between the routing protocol daemon 71, FIG. 2, and the protocol system process 52 handles the status change. The routing protocol daemon 71 constantly exchanges routing information as well as multicast group information with other switching nodes or communication devices 32, 36. The routing protocol daemon 71 is required to inform the protocol system process 52 of changes in the state of the multicast group as part of the resource reservation protocol. It is also preferred that the receiving communication devices 36D as shown in FIG. 1, which join or leave the multicast group send a resource maintenance message 330, FIG. 6, to insure the process of resource reservation. The routing protocol daemon 71, FIG. 2, determines that a change in the state of the multicast group has occurred.

In step 200, FIG. 5, a resource maintenance message is sent from the protocol system process of one switching node to another switching node with the desired destination being the sender node 32. The resource maintenance message 330, FIG. 6, is sent along a routing path based upon the route defined in the routing table at the switching node when there is a determination of a change in the state of the multicast group. Preferably, the route in which the resource maintenance message follows is along the routing path defined by the routing tables stored in memory at the routing protocol daemon 71, FIG. 2, of the various switching nodes. The resource maintenance message is routed to different switching nodes along the routing path until there is a determination that there is no need to further route the message. If needed, the resource maintenance message is routed along the routing path until it reaches the sender node 32. The resource maintenance message is transmitted to the sender communication device 32 initiating the multicast data communication application to mark maintenance of the resource reservation in response to the determination that a change has occurred in the state of the multicast group. The resource maintenance message is sent under the following conditions:

1. The routing table 80, FIG. 3, is changed at a switching node. When the routing table is changed due to the addition or deletion of the links or because of link failure, the routing table changes from the routing protocol daemon 71, FIG. 2, are sent to the protocol system process software 52 in each switching node 34 for further processing;

2. Quality of service degradation (possibly due to increased delays, missing data packets, etc.) is observed or detected in a receiving node 36; or 3. A new receiving node either joins or leaves the multicast group.

The step of determining when a new switching node (such as switching node 34D of FIG. 1) has been added to the multicast group is performed for the condition of a new node joining the group. In particular, under normal operation, a new switching node 36D, FIG. 1, is added to the group upon another new receiver node 34D, FIG. 1, not previously in the group, being identified as desiring to join the multicast group. The new receiver node 36D is coupled with a switching node 34D (as seen in FIG. 1 by link 35) which is also new to the multicast group.

The switching node 34D is added to the multicast group 30 because the receiving node 36D is the first receiving node on switching node 34D in the group. The receiving node 36D sends a report from the application process 60 indicating a joining to the multicast group. The switching node 34D, acting as the multicast group gateway, must exchange the new information regarding the joining to the existing group with other switching nodes via the routing protocol daemon 71, FIG. 2. Complying with the existing protocol, both the application process of the receiving node and the routing protocol daemon of the switching node are informed of the joining of the multicast group. The software supporting multicast function at the receiving node will preferably provide the interface to the application for maintaining multicast communication as specified in request for comment(RFC) 1112. See, S. Deering, "Host Extensions for IP Multicasting", Network Working Group, Request For Comment: 1112, (August 1989).

Alternatively, the situation may arise in which the adding of an additional switching node 34D, FIG. 1, to the multicast group is done based on an indication of joining the multicast group from the application software. The multicast supporting software across the network shall provide the indication to the routing protocol daemon.

A change in the multicast group also occurs when one of the switching nodes 34D, FIG. 1, is deleted from the multicast group. In RFC (Request for Comment) 1112, the applications support the interface of the communication device leaving the multicast group and inform the extended Internet Protocol(IP) multicast service in the receiving node. Preferably, the interface is provided to the resource reservation protocol upon a communication device 36D leaving the multicast group.

The deletion of a switching node 34D from the group may occur because a link failure has been identified at a link associated with a switching node of the group. For example, if a link failure occurs at links 29 and 33 as seen in FIG. 1, then switching node 34D is deleted from the remainder of the multicast group. Link failure is determined at the lower data link layer of the protocol. Under normal operations within the network, the deletion of a switching node from the group is determined upon an indication that one or more receiving nodes coupled with a particular switching node leave or are removed from the multicast group. For example, if receiving node 36D, FIG. 1, leaves or is removed from the multicast group, then switching node 34D will accordingly be removed from the group. In the situation where all the receiving communication devices 36D coupled with a particular switching node 34D are removed from the multicast group, then preferably that particular switching node 34D also leaves the group.

As seen in step 200, FIG. 5, preferably under such conditions a resource maintenance message is transmitted to the upstream intermediate switching node with the destination being the sender node 36. In step 202, FIG. 5, the switching node 34 checks the resource maintenance message. The switching node 34 maintains a table of paths under maintenance and a timer associated with the table. If a specific path has been entered into the maintenance list, the new arriving resource maintenance message is dropped to avoid excessive message flow to the upstream switching nodes and sender node. The timer maintained in the resource maintenance list is used for screening the upstream resource maintenance message. A resource maintenance message is preferably sent upstream when the timer expires. After receiving, for example, a routing table change notification, the protocol system process 52 of the switching node 34 examines the affected soft state and sends a resource maintenance message to the multicast sender node. In particular, the switching nodes 34A–34D, FIG. 1, which receive the resource maintenance message check the message to see if a resource maintenance message is required along the multicast path for the data communication application being performed. The protocol system process entity 52, FIG. 2, of the switching node 34 marks the resource reservation to be under maintenance. Upon checking the resource maintenance message, in step 204, FIG. 5, the protocol system process of the switching node determines if a new resource maintenance is required due to the identified change in the state of the multicast group.

If no new maintenance is needed, then in step 206, FIG. 5, then in step 206 the resource maintenance message is dropped at the switching node in which it is determined that no new maintenance is needed. The processing ends for maintenance or repairment along the routing path once the resource maintenance message is dropped. If it is determined that further maintenance is required, then in step 208, FIG. 5, the protocol system process builds a maintenance soft state. Particularly, the step of building maintenance soft state at the switching nodes 36 along the routing path according to the routing table is performed in response to the determination that repairment or maintenance is required. For a switching node 34 along the multicast path under maintenance, the multicast group is marked as "under maintenance" and the switching node sends the resource maintenance message back to the sender communication device 32 of the multicast group. As seen in step 210, FIG. 5, the resource maintenance message is then forwarded along the path either to the designated switching node or to the sender node 32 The processing then moves to step 212 upon the resource maintenance message being received at the particular switching node or sender node. The processing then moves to step 100 of FIG. 4 to initiate the path and reservation communications for resource reservation operation. Path messages are selectively transmitted from the sender node 32 after appropriate maintenance is accomplished.

The foregoing detailed description describes a method of data communication in a multicast environment. The method has been described without reference to specific hardware or software. Instead, the method has been described in such a way that those skilled in the art can readily adapt hardware or software as may be available or preferable. While this invention is described with reference to one method of communication in a multicasting environment, it is understood that those skilled in the art may apply these teachings to other contexts or devise numerous other arrangements without departing from the scope of the invention.

What is claimed is:

1. A method for establishing and maintaining data communications between selected ones of a plurality of communication devices defining a multicast group interconnected by a communications network of switching nodes, comprising the steps of:

determining when there is a change in the state of the multicast group;

normally maintaining a resource reservation, initiated by transmission of a path message and a reservation message along a multicast path, of each receiving communication device along the multicast path in response to data being substantially continuously received at the switching nodes unless there is a change in the state of the multicast group; and changing the resource reservation of each receiving communication device along the multicast path to a new resource reservation even while data is being substantially continuously received in response to determination of the change in the state of the multicast group.

2. The method of claim 1 in which the step of determining includes the step of determining when one of the switching nodes has been added to the multicast group.

3. The method of claim 2 in which the step of determining when one of the switching nodes has been added to the multicast group includes the step of identifying that another receiving communication device coupled with the one added switching node has joined the multicast group.

4. The method of claim 3 in which the step of determining when one of the switching nodes has been added to the multicast group includes the step of sending a report indicating a joining to the multicast group from the other receiving communication device to the one added switching node.

5. The method of claim 1 in which the step of determining includes the step of determining when one of the switching nodes has been deleted from the multicast group.

6. The method of claim 5 in which the step of determining when one of the switching nodes has been deleted includes the step of determining that a link failure has occurred.

7. The method of claim 5 in which the step of determining when one of the switching nodes has been deleted from the multicast group includes the step of determining that one or more receiving communication devices leaves the multicast group.

8. The method of claim 1 in which the step of determining includes the step of detecting when there has been a degradation in the quality of service at a receiving communication device along the multicast path.

9. The method of claim 1 in which the step of determining includes the step of determining that there has been a change in a routing table for a switching node.

10. The method of claim 1 in which the step of normally maintaining includes the step of sending the path message from a sender communication device to a receiving communication device along the multicast path.

11. The method of claim 10 including the step of disabling a timer to prevent the sending of additional path messages.

12. The method of claim 10 including the step of preventing a time-out value from being specified in the path message.

13. The method of claim 10 including the step of assigning a time-out value in the path message to simulate disablement of a timer for refreshing resource reservation.

14. The method of claim 10 in which the step of normally maintaining includes the step of establishing a soft state at the switching nodes to identify incoming and outgoing links for the path message.

15. The method of claim 14 in which the step of normally maintaining includes the steps of receiving the path message at each receiving communication device along the multicast path, and sending a reservation message from each receiving communication device along the multicast path to the sender communication device via the switching nodes.

16. The method of claim 14 including the step of establishing a protocol system process at each switching node, and in which the step of normally maintaining includes the steps of receiving the reservation message at the protocol system process of the switching nodes, and passing resource reservation specification information from the protocol system process to a packet scheduler and classifier associated with each switching node.

17. The method of claim 1 in which the step of changing includes the step of sending a resource maintenance message to mark maintenance of the resource reservation in response to the determination of a change in the state of the multicast group.

18. The method of claim 17 including the step of routing the resource maintenance message along a routing path defined by routing tables stored at the switching nodes.

19. The method of claim 18 including the steps of checking the resource maintenance message at the switching nodes which receive the resource maintenance message, and determining if maintenance along the routing path is required due to the change in the state of the multicast group.

20. The method of claim 19 including the step of building a maintenance soft state at the switching nodes along the routing path in response to the determination that maintenance is required.

21. The method of claim 20 including the step of sending the resource maintenance message to a sender communication device.

22. The method of claim 21 including the steps of processing the resource maintenance message at the sender communication device, and transmitting path messages from the sender communication device upon receiving the resource maintenance message at the sender communication device.

* * * * *